United States Patent
Kosugi

(10) Patent No.: US 11,765,141 B2
(45) Date of Patent: Sep. 19, 2023

(54) PROCESSING DEVICE, PROCESSING METHOD, AND NON-TRANSITORY STORAGE MEDIUM

(71) Applicant: InsuRTAP Inc., Tokyo (JP)

(72) Inventor: Shinichiro Kosugi, Tokyo (JP)

(73) Assignee: InsuRTAP Inc., Tokyo (JP)

( * ) Notice: Subject to any disclaimer, the term of this patent is extended or adjusted under 35 U.S.C. 154(b) by 0 days.

(21) Appl. No.: 17/790,848

(22) PCT Filed: Jan. 6, 2020

(86) PCT No.: PCT/JP2020/000030
§ 371 (c)(1),
(2) Date: Jul. 5, 2022

(87) PCT Pub. No.: WO2021/140537
PCT Pub. Date: Jul. 15, 2021

(65) Prior Publication Data
US 2023/0022953 A1 Jan. 26, 2023

(51) Int. Cl.
*H04L 29/06* (2006.01)
*H04L 9/40* (2022.01)

(52) U.S. Cl.
CPC ........ *H04L 63/0435* (2013.01); *H04L 63/062* (2013.01); *H04L 63/0876* (2013.01)

(58) Field of Classification Search
CPC ............... H04L 63/0435; H04L 63/062; H04L 63/0876; H04L 9/0866; H04L 63/10;
(Continued)

(56) References Cited

U.S. PATENT DOCUMENTS

2002/0015497 A1\* 2/2002 Maruyama ............. G06F 21/10
713/171
2002/0034302 A1\* 3/2002 Moriai .................. H04L 9/0827
380/270
(Continued)

FOREIGN PATENT DOCUMENTS

JP 2002-56320 A 2/2002
JP 2003-141423 A 5/2003
(Continued)

OTHER PUBLICATIONS

Kiyomoto et al, LMM: A Common Component for Software License Management on Cloud, Jul. 31, 2013, IEEE, pp. 1-12. (Year: 2013).\*

(Continued)

*Primary Examiner* — Philip J Chea
*Assistant Examiner* — Jenise E Jackson
(74) *Attorney, Agent, or Firm* — Sughrue Mion, PLLC

(57) ABSTRACT

A processing device includes a storage unit that stores device-specific information in association with device identification information for identifying each of a plurality of devices, an authentication key request reception unit that receives an authentication key request including the device identification information, an authentication key issuing unit that issues the authentication key, a license key request reception unit that receives a license key request including the device identification information and the authentication key, a license key issuing unit that issues a license key, a user identification information registration unit that stores the user identification information of the user who has presented the license key, in association with the device identification information associated with the license key, and a device control unit that integrally controls the plurality of devices identifying a plurality of pieces of device identification (Continued)

information associated with the same user identification information.

9 Claims, 9 Drawing Sheets

(58) Field of Classification Search
CPC ....... H04L 63/107; G06F 21/31; G06F 21/44; G06F 21/552; G06F 21/57; G06F 21/62
See application file for complete search history.

(56) References Cited

U.S. PATENT DOCUMENTS

| | | | |
|---|---|---|---|
| 2004/0148262 A1* | 7/2004 | Yamamoto | G06F 21/105 705/59 |
| 2006/0031172 A1* | 2/2006 | Otsuka | H04L 63/062 705/59 |
| 2007/0206799 A1* | 9/2007 | Wingert | H04L 9/0825 348/E7.071 |
| 2007/0249332 A1* | 10/2007 | Matsuhashi | H04M 3/42178 455/422.1 |
| 2010/0251387 A1* | 9/2010 | Takeda | G06F 21/10 707/674 |
| 2011/0072493 A1* | 3/2011 | Morishita | H04L 63/0853 726/3 |
| 2013/0026972 A1 | 1/2013 | Luke et al. | |
| 2013/0066791 A1 | 3/2013 | Sakamoto et al. | |
| 2013/0301481 A1* | 11/2013 | Inoue | H04L 65/80 370/259 |
| 2014/0082609 A1* | 3/2014 | Ono | G06F 8/60 717/177 |
| 2018/0068095 A1* | 3/2018 | Yamazaki | G06F 21/10 |
| 2018/0144109 A1* | 5/2018 | Kamakura | G06F 21/629 |
| 2021/0019247 A1* | 1/2021 | Hurley | G06F 11/3051 |
| 2021/0097152 A1* | 4/2021 | Takasawa | H04L 9/3247 |

FOREIGN PATENT DOCUMENTS

| | | |
|---|---|---|
| JP | 2004-318291 A | 11/2004 |
| JP | 2017-212843 A | 11/2017 |

OTHER PUBLICATIONS

Wang et al., A Study of Superdistribution Model for Family Domain in DRM System, Aug. 29, 2007, IEEE, pp. 133-138. (Year: 2007).*
International Search Report for PCT/JP2020/000030 dated, Mar. 31, 2020 (PCT/ISA/210).
Supplementary European Search Report dated Dec. 5, 2022 in European Application No. 20911912.2.

* cited by examiner

FIG. 4

| DEVICE IDENTIFICATION INFORMATION | AUTHENTICATION KEY | LICENSE KEY | LICENSE KEY VALIDITY |
|---|---|---|---|
| MX001329 | 1M9812P | PQ13QQ24 | VALID |
| MP112118 | 77N1A18 | MN72TS11 | INVALID |
| QL731194 | 22ST113 | — | — |
| ... | ... | ... | ... |

FIG. 5

| DEVICE IDENTIFICATION INFORMATION | DEVICE-SPECIFIC INFORMATION | | | | | | |
|---|---|---|---|---|---|---|---|
| | INFORMATION AT TIME OF SHIPMENT | FIRST USER-RELATED INFORMATION | | | | SECOND USER-RELATED INFORMATION | |
| | MEASUREMENT DATA | USE START DATE | USE END DATE | LOCATION | ... | USE START DATE | ... |
| MX001329 | 2017.9.13 (*) | 2017.11.18 | 2019.5.27 | SHINAGAWA-KU, TOKYO | 2017.11.18 (*) 2017.12.18 (***) ... | 2019.8.17 | ... |
| PP313129 | 2017.8.21 (***) | | | | | | |
| | | | | | | | ... |

FIG. 7

| DEVICE IDENTIFICATION INFORMATION | AUTHENTICATION KEY | LICENSE KEY | LICENSE KEY VALIDITY | USER IDENTIFICATION INFORMATION |
|---|---|---|---|---|
| MX001329 | 1M9812P | PQ13QQ24 | VALID | 113128 |
| MP112118 | 77N1A18 | MN72TS11 | INVALID | 121218 |
| QL731194 | 22ST113 | PP11MS18 | VALID | 113128 |
| .... | .... | .... | .... | .... |
| ⋮ | ⋮ | ⋮ | ⋮ | .... |

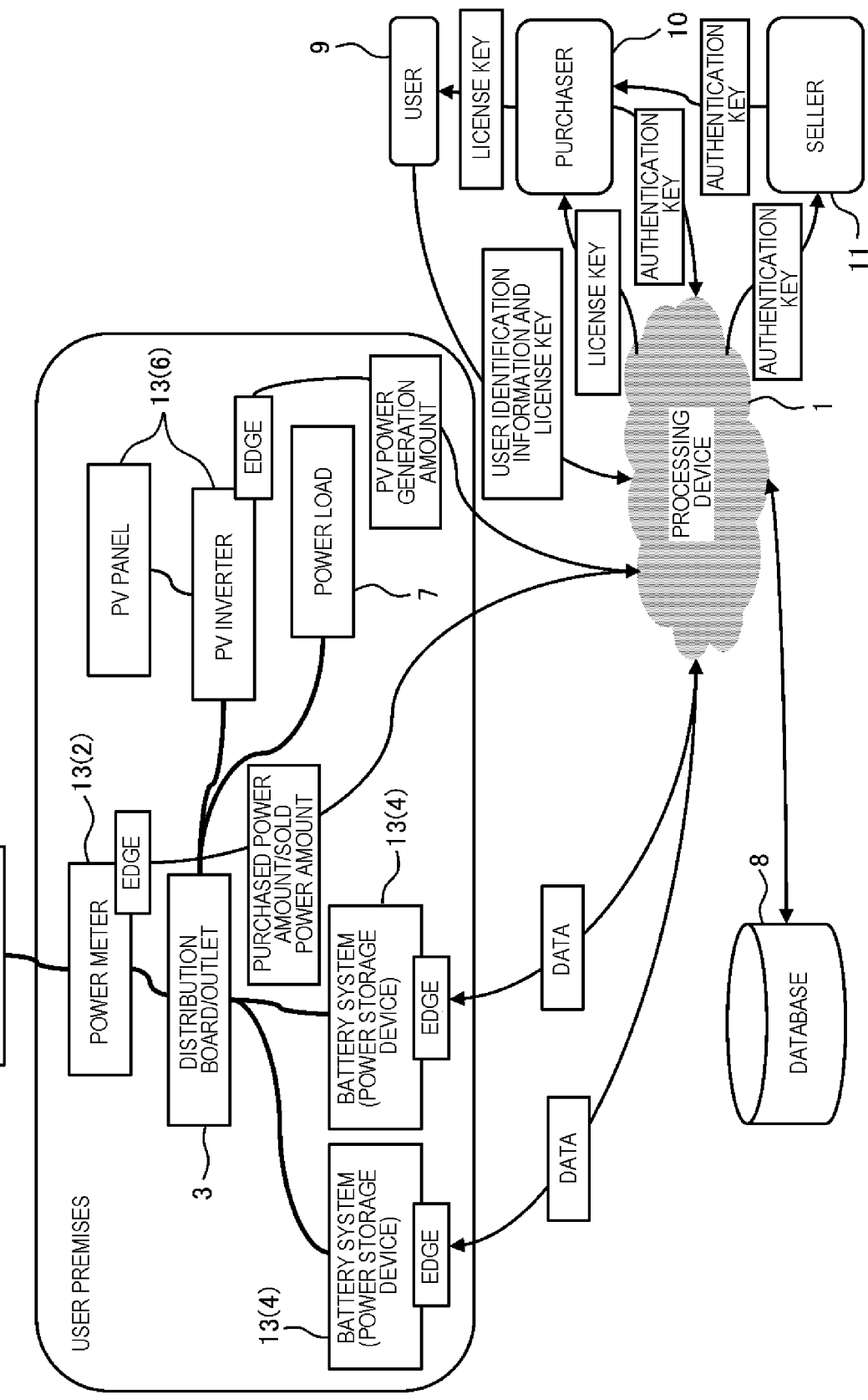

PROCESSING DEVICE, PROCESSING METHOD, AND NON-TRANSITORY STORAGE MEDIUM

CROSS REFERENCE TO RELATED APPLICATIONS

This application is a National Stage of International Application No. PCT/JP2020/000030 filed Jan. 6, 2020.

TECHNICAL FIELD

The present invention relates to a processing device, a processing method, and a program.

BACKGROUND ART

Patent Document 1 discloses a technique for controlling a battery system or a power generation device held by a consumer.

RELATED DOCUMENT

Patent Document

[Patent Document 1] Japanese Laid-open Patent Publication No. 2017-212843

SUMMARY OF THE INVENTION

Technical Problem

In recent years, battery systems and power generation devices have become widespread. In the future, it is considered that the number of users who use a plurality of battery systems or use the battery system and a power generation device increases. When a plurality of power-related devices are used as described above, an effect of using the devices (power saving effect, and the like) is enhanced by integrally controlling the plurality of power-related devices. However, since the battery system and the power generation device are expensive, it is considered that not only the number of users who purchase and use the battery system and the power generation device by themselves, but also the number of users who rent and use the battery system and the power generation device increases. Under such circumstances, there has been no conventional unit that grasps and manages a plurality of power-related devices used by users.

An object of the present invention is to provide a unit that grasps and manages a plurality of power-related devices used by a user.

Solution to Problem

According to the present invention, there is provided a processing device including a storage unit that stores device-specific information in association with device identification information for identifying each of a plurality of devices, an authentication key request reception unit that receives an authentication key request including the device identification information, an authentication key issuing unit that issues an authentication key in response to the authentication key request, transmits the issued authentication key as a response, and stores the issued authentication key in the storage unit in association with the device identification information included in the authentication key request, a license key request reception unit that receives a license key request including the device identification information and the authentication key, a license key issuing unit that, when the storage unit stores a combination of the device identification information and the authentication key included in the license key request, issues a license key for receiving a predetermined service related to the device, transmits the issued license key as a response, and stores the issued license key in the storage unit in association with the device identification information included in the license key request, a user identification information registration unit that stores user identification information of a user who has presented the license key, in the storage unit in association with the device identification information associated with the license key, and a device control unit that integrally controls the plurality of the devices identified by a plurality of pieces of the device identification information associated with the same user identification information.

Further, according to the present invention, there is provided a program causing, by a computer, storing device-specific information in association with device identification information for identifying each of a plurality of devices, receiving an authentication key request including the device identification information, issuing an authentication key in response to the authentication key request, transmitting the issued authentication key as a response, and storing the issued authentication key in a storage unit in association with the device identification information included in the authentication key request, receiving a license key request including the device identification information and the authentication key, when the storage unit stores a combination of the device identification information and the authentication key included in the license key request, issuing a license key for receiving a predetermined service related to the device, transmitting the issued license key as a response, and storing the issued license key in the storage unit in association with the device identification information included in the license key request, storing user identification information of a user who has presented the license key, in the storage unit in association with the device identification information associated with the license key, and integrally controlling the plurality of the devices identified by a plurality of pieces of the device identification information associated with the same user identification information.

Further, according to the present invention, there is provided a program causing a computer to function as a storage unit that stores device-specific information in association with device identification information for identifying each of a plurality of devices, an authentication key request reception unit that receives an authentication key request including the device identification information, an authentication key issuing unit that issues an authentication key in response to the authentication key request, transmits the issued authentication key as a response, and stores the issued authentication key in the storage unit in association with the device identification information included in the authentication key request, a license key request reception unit that receives a license key request including the device identification information and the authentication key, a license key issuing unit that, when the storage unit stores a combination of the device identification information and the authentication key included in the license key request, issues a license key for receiving a predetermined service related to the device, transmits the issued license key as a response, and stores the issued license key in the storage unit in association with the device identification information included in the license key request, a user identification information registration unit that stores user identification information of a user who has presented the license key, in the storage unit in association with the device identification information associated with the license key, and a device control unit that integrally controls the plurality of the devices identified by a plurality of pieces of the device identification information associated with the same user identification information.

Advantageous Effects of Invention

According to the present invention, a unit that grasps and manages a plurality of power-related devices used by a user is realized.

BRIEF DESCRIPTION OF THE DRAWINGS

The above-described objectives, other objectives, features, and advantages will be further clarified by the preferred embodiments described below and the accompanying drawings.

FIG. 4 is a schematic diagram showing an example of information processed by the processing device in the present embodiment.

FIG. 5 is a schematic diagram showing an example of information processed by the processing device in the present embodiment.

FIG. 7 is a schematic diagram showing an example of the information processed by the processing device in the present embodiment.

FIG. 9 is a diagram showing an application example of the processing device in the present embodiment.

DESCRIPTION OF EMBODIMENTS

First Embodiment

"Outline"

A processing device according to the present embodiment stores information (hereinafter, "device-specific information") specific to each of a plurality of devices. The device-specific information is, for example, information indicating whether the product is new or used, information indicating the use history up to that point, information indicating the current characteristics, the lifespan and safety calculated based on measurement data measured so far, and the like. The device-specific information is not limited to the above types of information. The details of the device-specific information will be described later.

The processing device issues an authentication key for each device in response to a request from a seller of the device. The seller may be a person who sells a new device or a person who sells a used device.

The processing device issues a license key for each device in response to a request from a purchaser. The purchaser may be a person who has purchased a new device or a person who has purchased a used device.

The processing device controls the revelation of the device-specific information of each device in accordance with the issuance states of the authentication key and the license key. Specifically, the processing device reveals device-specific information of a device having the issued authentication key, in response to the issuance of the authentication key. That is, when the seller requests and issues an authentication key for each device to be sold, the device-specific information for each device to be sold is revealed in response to the request and issuance. The processing device sets the device-specific information of the device having the issued license key not to be revealed in response to the issuance of the license key. That is, when the purchaser requests and issues a license key for each purchased device, the device-specific information of the device that belongs to the purchaser is not revealed in response to the request and issuance.

"Configuration"

Next, the configuration of the processing device will be described in detail. First, an example of the hardware configuration of the processing device will be described. Each functional unit included in the processing device is realized by any combination of hardware and software mainly including a central processing unit (CPU), a memory, a program loaded onto the memory, a storage unit such as a hard disk that stores the above program, and an interface for a network connection, in any computer. The above storage unit can store a program downloaded from a storage medium such as a compact disc (CD), or a server and the like on the Internet in addition to a program stored, in advance, at a state of shipping the device. It is understood by those skilled in the art that there are various modification examples in a method and device of realizing the functional unit.

Figure 1:
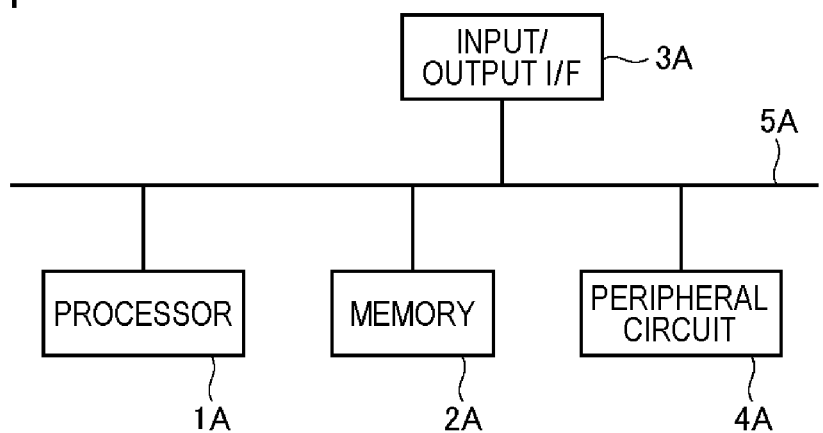
FIG. 1 is a diagram showing an example of a hardware configuration of a processing device according to the present embodiment.

FIG. 1 is a block diagram showing the hardware configuration of the processing device. As shown in FIG. 1, the processing device includes a processor 1A, a memory 2A, an input/output interface 3A, a peripheral circuit 4A, and a bus 5A. The peripheral circuit 4A includes various modules. The processing device does not have to include the peripheral circuit 4A. The processing device may be configured by a plurality of physically and/or logically separated devices, or may be configured by one physically and/or logically integrated device. When the processing device is configured by a plurality of physically and/or logically separated devices, each of the plurality of devices can have the above hardware configuration.

The bus 5A is a data transmission path used when the processor 1A, the memory 2A, the peripheral circuit 4A, and the input/output interface 3A transmit and receive data to each other. The processor 1A is, for example, an arithmetic operation processing device such as a CPU or a graphics processing unit (GPU). The memory 2A is, for example, a memory such as a random access memory (RAM) or a read only memory (ROM). The input/output interface 3A includes, for example, an interface for acquiring information from an input device, an external device, an external server, an external sensor, a camera, and the like, and an interface for outputting information to an output device, an external device, an external server, and the like. The input device is, for example, a keyboard, a mouse, a microphone, a physical button, or a touch panel. The output device is, for example, a display, a speaker, a printer, or a mailer. The processor 1A can issue a command to each module and perform an arithmetic operation based on the arithmetic operation result thereof.

Figure 2:
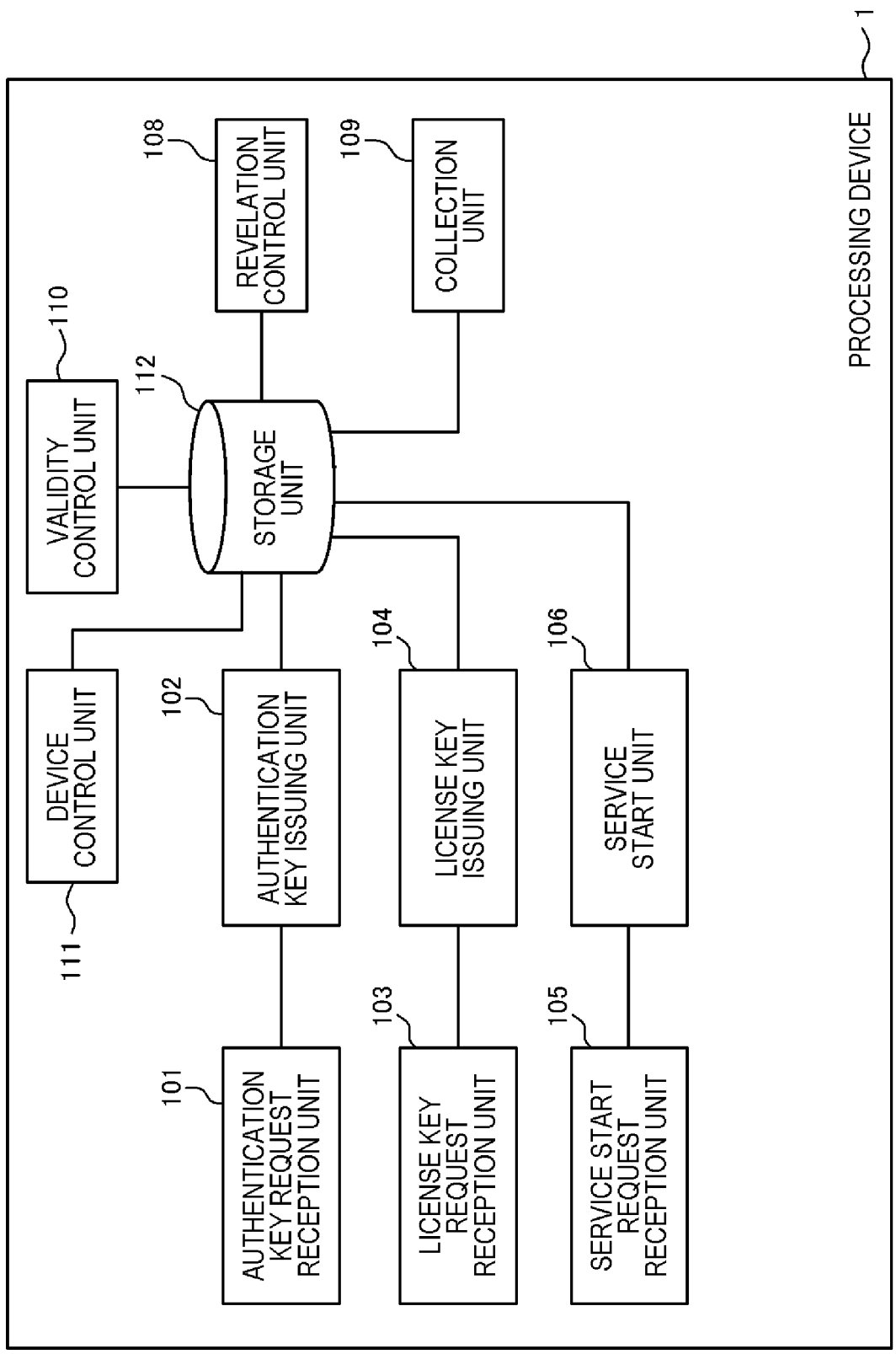
FIG. 2 is an example of a functional block diagram of the processing device in the present embodiment.

Next, the functional configuration of the processing device 1 will be described. FIG. 2 shows an example of a functional block diagram of the processing device 1 in the present embodiment. As shown in FIG. 2, the processing device 1 includes an authentication key request reception unit 101, an authentication key issuing unit 102, a license key request reception unit 103, a license key issuing unit 104, a service start request reception unit 105, a service start unit 106, a revelation control unit 108, a collection unit 109, a validity control unit 110, a device control unit 111, and a storage unit 112.

The configuration of each functional unit will be described in detail together with the processing flow of the processing device 1 by using the sequence diagram in FIG. 3.

First, a device 13, a seller 11, a purchaser 10, and a user 9 shown in the sequence diagram in FIG. 3 will be described.

The device 13 is a device having device-specific information of which revelation/non-revelation is controlled by the processing device 1. The device 13 may be, for example, a power-related device such as a battery system, a power generation device, or a power meter, or may be another device.

The seller 11 is a person who sells the device 13. The seller 11 may be a person who sells a new device 13 or a person who sells a used device 13.

The purchaser 10 is a person who has purchased the device 13. The purchaser 10 may be a person who has purchased a new device 13 or a person who has purchased a used device 13.

The user 9 is a person who uses the device 13. The user 9 and the purchaser 10 may be the same subject. The user 9 may be a person who borrows the device 13 from the purchaser 10 and uses the device 13.

Next, the configuration of each functional unit will be described in detail together with the processing flow of the processing device 1.

First, the authentication key request reception unit 101 receives an authentication key request including device identification information (S101). The seller 11 operates a terminal device of the seller 11 to transmit an authentication key request including device identification information of each device 13 to the processing device 1 for each device 13 to be sold. The authentication key request reception unit 101 receives the authentication key request transmitted from the external device in this manner. The transmission of the authentication key request to the processing device 1 may be realized through a web page, an application, or the like, or may be realized by other units.

Then, the authentication key issuing unit 102 issues an authentication key in response to the authentication key request received in S101 (S102). The authentication key issuing unit 102 transmits the issued authentication key as a response (S103). The authentication key issuing unit 102 stores the issued authentication key in the storage unit 112 in association with the device identification information included in the authentication key request received in S101.

Here, FIG. 4 schematically shows an example of information stored in the storage unit 112. In the example shown in FIG. 4, device identification information, an authentication key, a license key, and a license key validity are associated with each other. As will be clarified in the following description, in the present embodiment, the authentication key is issued, and then the license key is issued. A time lag may occur between the issuance of the authentication key and the issuance of the license key. Therefore, as shown in FIG. 4, device identification information which is associated with only the authentication key and is not associated with the license key may be generated. Further, as will be clarified in the following description, the license key in the present embodiment may be in a valid state or an invalid state. Therefore, the processing device 1 manages the state of each license key in accordance with the value in a license key validity column illustrated in FIG. 4.

Returning to FIG. 3, the revelation control unit 108 reveals the device-specific information of the device 13 having the issued the authentication key, in response to the issuance of the authentication key (S104). For example, in the information shown in FIG. 4, the revelation control unit 108 reveals the device-specific information of the device 13 identified by device identification information newly associated with the authentication key.

FIG. 5 schematically shows an example of the device-specific information stored by the storage unit 112. In the example shown in FIG. 5, the device identification information and the device-specific information are associated with each other.

The device-specific information is information specific to each device 13, and is accumulated in accordance with the use of the device 13. For example, in a new product state, as in the example of device identification information "PP313129", various types of measurement data of each device 13, which are obtained by measurement at the time of shipment, and the performance, lifespan, and safety of the device 13, which are calculated based on the various types of measurement data, and the like may be registered. The measurement data is a design matter. For example, when the device 13 is a battery system, battery management system (BMS) software, software authentication key, the software version number, and the like are exemplified. With such types of information, it is possible to prove the change history of the BMS software. For example, when a guarantee condition described in the following embodiments includes a case where "BMS software has not been changed", it is possible to prove that the guarantee condition is satisfied, with such information. As another example of the measurement data, control parameters of the BMS, for example, an SOC use range during charging/discharging (for example, SOC 10% to 90%), a battery voltage range, a stop setting temperature of a high temperature and low temperature or higher, and the like are exemplified. With such types of information, it is possible to prove that the control parameters are set within a predetermined range. For example, when the guarantee condition described in the following embodiments includes "prohibition of changing the control parameters", a case where "the control parameters are set within a predetermined range", and the like, it is possible to prove that the guarantee condition is satisfied, with such information. As still another example of the measurement data, BMS arithmetic operation data, for example, the state of health (SOH, current capacity), cumulative discharged energy, cumulative charged energy, and the like are exemplified. With such types of information, it is possible to prove the history of the values and that the values are used within a predetermined range (within a guaranteed range or the like). As other examples of the measurement data, BMS measurement data such as a time point, a battery current, a cell voltage, a temperature, and an insulating resistance value is exemplified. With such types of information, it is possible to prove the history of the values and that the values are used within a predetermined range (within a guaranteed range or the like). A calculation method of the performance, the lifespan, the safety, and the like based on the measurement data is a design matter, and any technique in the related art can be adopted. Information accumulated in accordance with the use will be described later.

Although there are various methods of revelation, for example, the revelation control unit 108 may reveal device-specific information of the device 13 to be revealed on a web page or an application page. For example, the revelation control unit 108 may display a list of pieces of device-specific information of the devices 13 to be revealed. The revelation control unit 108 may perform search under a predetermined search condition designated by a viewer and display a list of device-specific information of the hit device 13. The above displayed list does not include device-specific information of the device 13 to be not-revealed.

With the revelation process in S104, the device-specific information of the device 13 that is sold by the seller 11 and has the authentication key issued by the authentication key request of the seller 11 is revealed. Then, the purchaser 10 who examines the purchase of the device 13 operates, for example, the terminal device of the purchaser 10 to request the device-specific information of the device 13 through a predetermined web page or application. The processing device 1 transmits the device-specific information stored in the storage unit 112 in response to the request (S105). Thus, the purchaser 10 who examines the purchase of the device 13 can view the device-specific information of this device 13.

When the purchaser 10 determines the purchase of a predetermined device 13 based on the device-specific information, the purchaser 10 purchases the device 13 from the seller 11. When the seller 11 sells the device 13 to the purchaser 10 (S106), the seller 11 notifies the purchaser 10 of the authentication key issued in S103 (S107). As a notification unit, a medium by speaking, writing, or the like, an electronic mail, and the like are exemplified, and the notification unit is not limited to this.

After purchasing the device 13, the purchaser 10 operates the terminal device of the purchaser 10 to transmit, to the processing device 1, the device identification information of the purchased device 13 and a license key request including the authentication key of which a notification is issued in S107. The license key request reception unit 103 receives the license key request transmitted from the external device in this manner (S108). The transmission of the license key request to the processing device 1 may be realized through a web page, an application, or the like, or may be realized by other units.

Then, when the storage unit 112 stores a combination of the device identification information and the authentication key included in the license key request received in S108 (see FIG. 4), the license key issuing unit 104 issues a license key in response to the license key request received in S108 (S109). As will be clarified in the following description, the license key is a key for authenticating that the user has a license to receive a predetermined service related to the device 13.

The license key issuing unit 104 transmits the issued license key as a response (S110). The license key issuing unit 104 stores the issued license key in the storage unit 112 in association with the device identification information included in the license key request received in S108 (see FIG. 4). The validity of the license key becomes "valid" at a time point at which the license key is newly stored in the storage unit 112.

The revelation control unit 108 sets the device-specific information of the device 13 having the issued license key not to be revealed in response to the issuance of the license key (S111). For example, in the information shown in FIG. 4, the revelation control unit 108 sets the device-specific information of the device 13 identified by device identification information newly associated with the license key, not to be revealed.

For example, when the revelation control unit 108 displays a list of device-specific information of the device 13 to be revealed on a web page or an application page, the revelation control unit 108 does not include the device-specific information of the device 13 that is not revealed, in the list.

Even after the information is set not to be revealed, the processing device 1 may reveal, to a person who has presented the license key, the device-specific information associated with the device identification information associated with this license key (device-specific information set not to be revealed).

Then, when the purchaser 10 rents the purchased device 13 to the user 9, the purchaser 10 notifies the user 9 of the license key issued in S109 (S112). As a notification unit, a medium by speaking, writing, or the like, an electronic mail, and the like are exemplified, and the notification unit is not limited to this.

The user 9 operates the terminal device of the user 9 to transmit, to the processing device 1, a service start request including the device identification information of the rented device 13 and the license key of which the notification is issued in S112. The service start request reception unit 105 receives the service start request transmitted from the external device in this manner (S113). The transmission of the service start request to the processing device 1 may be realized through a web page, an application, or the like, or may be realized by other units.

Then, when the storage unit 112 stores a combination of the device identification information and the license key included in the service start request received in S113 (see FIG. 4), the service start unit 106 starts a predetermined service for the device 13 identified by the device identification information included in the service start request received in S113 (activates the device 13) (S114).

In response to the start of the predetermined service, the device control unit 111 starts the control of the device 13. The device control unit 111 transmits control information for controlling the device 13 to the device 13 (S115). The device 13 runs based on the control information or measures various types of measurement data related to the device 13 (S116).

The predetermined service and the control content by the device control unit 111 are design matters and are not particularly limited. For example, when the device 13 is a battery system, the predetermined service may be a service for remotely controlling charging/discharging. In this case, the device control unit 111 may transmit an instruction for charging or an instruction for discharging, to the device 13. For example, the device control unit 111 may control the charging/discharging of an electronic system so as to perform charging at night when the electricity charge is relatively low and to perform discharging in the daytime when the electricity charge is relatively high. In addition, the predetermined service may be the permission to run the device 13 and monitoring of the state of the device 13. By the monitoring, information indicating the state of the device 13 is accumulated.

The device 13 repeatedly measures various types of measurement data indicating the performance, safety, lifespan, and the like of the device 13, at predetermined timings while being used by the user 9 (S116). The device 13 may detect a measurement timing by itself and perform the measurement, or may perform the measurement in response to a measurement instruction from the processing device 1.

The collection unit 109 collects device-specific information of each device 13 and stores the device-specific information in the storage unit 112 as shown in FIG. 5.

For example, the collection unit 109 may receive the above measurement data from each device 13 (S117) and store the received measurement data in the storage unit 112 (S118). As shown in FIG. 5, the measurement data may be accumulated in association with the measurement date. The collection unit 109 may generate at least one of performance information, safety information, latest performance, and lifespan prediction of the device 13 based on the various types of accumulated measurement data, and stores the generated information in the storage unit 112 as the device-specific information. A unit that calculates the performance, the safety, the lifespan, and the like from the measurement data is a design matter, and any technique can be adopted.

The collection unit 109 may acquire information indicating a location where the device 13 is used, and store the acquired information in the storage unit 112 as the device-specific information. For example, when the device 13 includes a unit that acquires position information such as a global positioning system (GPS), the collection unit 109 may acquire information indicating a use location from each device 13. In addition, the user 9 may operate an operation terminal of the user to input a use location and transmit the input use location to the processing device 1. For example, the service start request in S113 may include information indicating the location where the device 13 is used.

The collection unit 109 may register the date when the predetermined service has started, as a use start date in response to the service start request (S113).

When the first user-related information column in FIG. 5 is open, the collection unit 109 can register the collected information in the first user-related information column. When the first user-related information column is filled, the collection unit 109 can register the collected information in the second user-related information column. Further, when the second user-related information column is also filled, the collection unit 109 can register the collected information in the third user-related information column. In this manner, the use history is accumulated in the same device 13 by a plurality of users 9.

Figure 3:
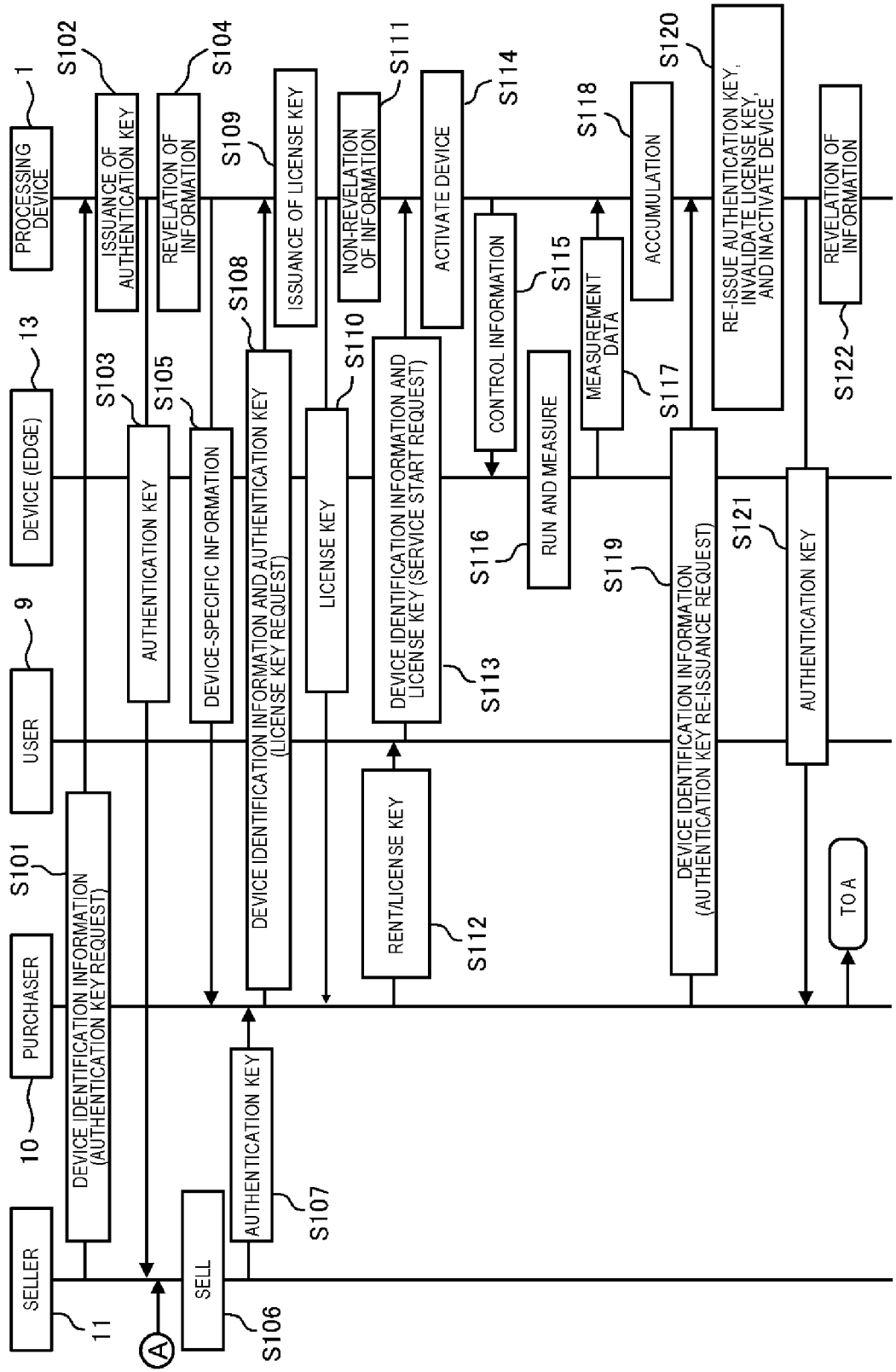
FIG. 3 is a sequence diagram showing an example of a processing flow of the processing device in the present embodiment.

Although not shown in the sequence diagram in FIG. 3, the purchaser 10 may be able to request the issuance of the license key a plurality of times based on the same authentication key. For example, when the purchaser 10 ends the rent to the current user 9 and rents the device 13 to a new user 9, the purchaser 10 can perform a request to issue a new license key in a process similar to S108, by using the authentication key of which the notification is issued in S107. When the processing device 1 issues a new license key in response to the license key request, the processing device 1 updates, to the new license key, the license key (see FIG. 4) associated with the device identification information included in the received license key request.

When the service start request (S113) including the new license key is received, the collection unit 109 determines that the user has changed, and registers the information collected thereafter, in the user-related information column different from the previous user-related information column.

Returning to FIG. 3, when the purchaser 10 determines to sell the purchased device 13, the purchaser 10 operates the terminal device of the purchaser 10 to transmit, to the processing device 1, an authentication key re-issuance request including device identification information of the device 13 to be sold. The authentication key request reception unit 101 receives the authentication key re-issuance request transmitted from the external device in this manner (S119).

Then, the authentication key issuing unit 102 re-issues an authentication key in response to the authentication key re-issuance request received in S119 (S120). The authentication key issuing unit 102 transmits the re-issued authentication key as a response (S121). The authentication key issuing unit 102 updates, to the re-issued authentication key, the authentication key (see FIG. 4) stored in the storage unit 112 in association with the device identification information included in the authentication key re-issuance request received in S119.

The validity control unit 110 invalidates the license key to be associated with the device identification information associated with the re-issued authentication key, in response to the re-issuance of the authentication key (S120). Due to the invalidation of the license key, the service start unit 106 ends the predetermined service for the device 13 identified by the device identification information associated with the invalidated license key (inactivates the device 13) (S120). In response to such an end, the device control unit 111 stops the control of the device 13.

In response to the invalidation of the license key, the revelation control unit 108 reveals the device-specific information of the device 13 identified by the device identification information with which the associated license key has been invalidated (S122).

Then, the process returns to A shown in the sequence diagram in FIG. 3, and the same process is repeated.

"Advantageous Effect"

According to the processing device 1, it becomes possible to provide device-specific information of each device 13 for a person who examines purchase of the device 13. Further, according to the processing device 1, regardless of the change of the owner (purchaser 10) or the user 9, it is possible to collectively manage the history of each device 13 and provide the history as device-specific information of each device 13. According to such a processing device 1, the purchaser 10 can purchase a used device 13 with an easy mind.

Further, according to the processing device 1, it is possible to control the revelation of device-specific information of each device 13 based on the issuance state of the license key and whether or not the license key is valid. Therefore, it is possible to appropriately suppress the inconvenience that the device-specific information of the device 13 owned by a certain purchaser 10 is revealed.

Further, according to the processing device 1, since the use history and performance history data are centrally managed and shared from the time of a new product, the tendency of performance deterioration is shared by the whole society, and the transaction of new and used products is activated.

Further, according to the processing device 1, a person who sells a used device 13 can easily determine an appropriate selling price of the device 13 based on the device-specific information of each device 13. For example, the selling price of the device 13 is more easily determined by the latest performance comparison within a group having the same number of months of use and a group having almost the same mileage rate (cumulative charged/discharged kWh/rated capacity kWh).

Further, according to the processing device 1, since the authentication key for the purchaser 10 (owner) and the license key for the user 9 are separated from each other, the rights relationship becomes clear. The owner may stop using the device 13 and sell the device 13 at any time. The user 9 can freely set a use method with the license key.

Second Embodiment

"Configuration"

A processing device 1 in the present embodiment has functions of managing a user 9 using a plurality of devices 13 and the plurality of devices 13 in association with each other and integrally controlling the plurality of devices 13 associated with each user 9. The device 13 may be one type of device or may include a plurality of types of devices. For example, the device 13 may include at least one of a battery system, a power generation device, and a power meter. The device 13 associated with the user 9 includes a device 13 purchased and owned by the user 9 and a device 13 borrowed and used from the purchaser 10 by the user 9.

Figure 6:
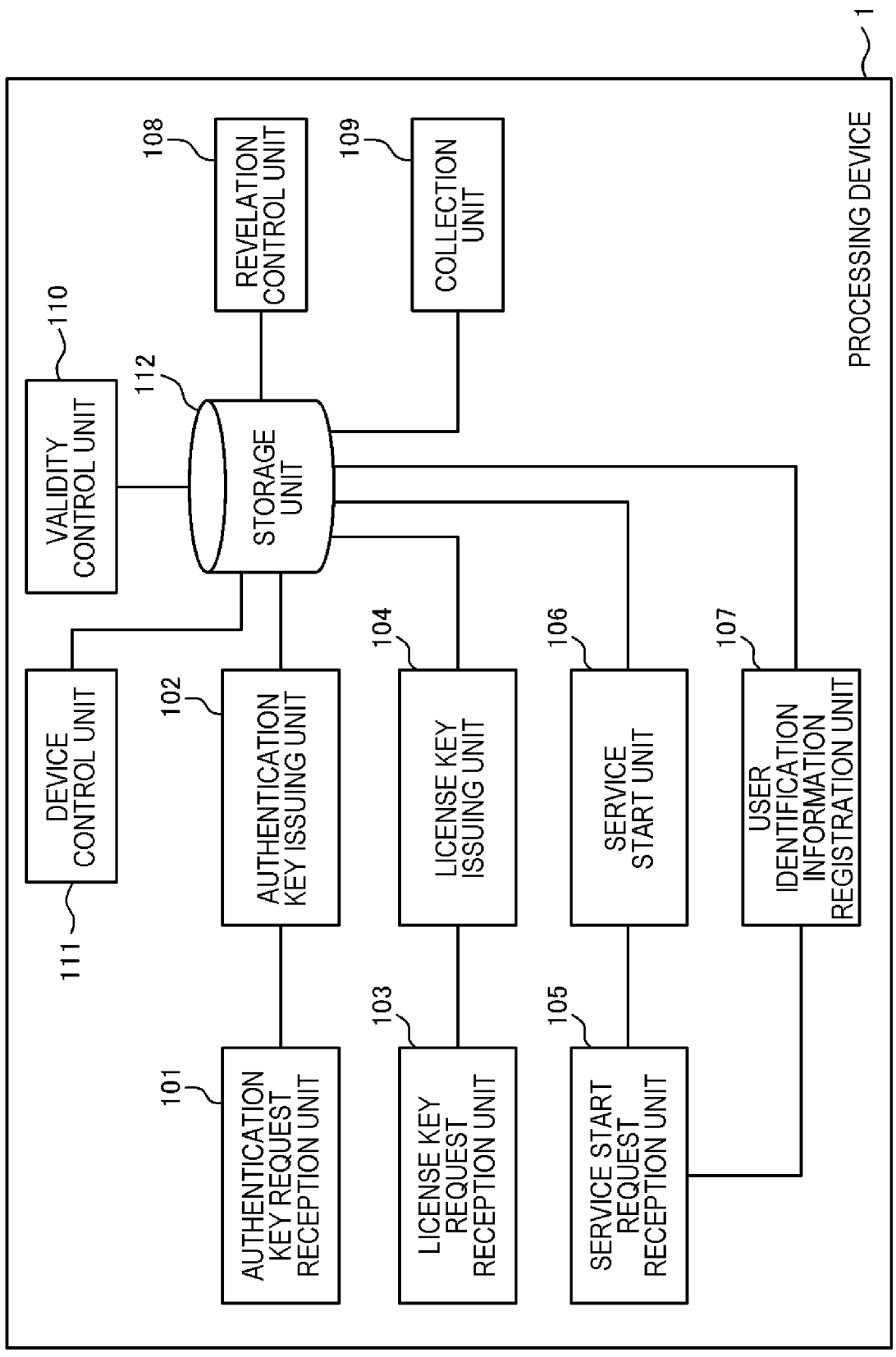
FIG. 6 is an example of the functional block diagram of the processing device in the present embodiment.

FIG. 6 shows an example of a functional block diagram of the processing device 1 in the present embodiment. The processing device 1 in the present embodiment is different from the first embodiment that the processing device 1 includes a user identification information registration unit 107. The processing device 1 in the present embodiment may or may not include the revelation control unit 108 as shown in FIG. 6.

The user identification information registration unit 107 stores user identification information of the user 9 who has presented a license key, in a storage unit 112 in association with device identification information associated with the license key. For example, the user 9 operates the terminal device of the user 9 to transmit the license key and the user identification information of the user 9 to the processing device 1. The transmission of such information may be realized through a web page, an application, or the like, or may be realized by other units. The user identification information registration unit 107 stores the received user identification information in the storage unit 112 in association with the device identification information associated with the received license key (see FIG. 7).

In the present embodiment, a plurality of types of devices 13 may be controlled and managed by the similar unit using an authentication key or a license key. The plurality of types of devices 13 may include a plurality of types of power-related devices such as a battery system, a power generation device, and a power meter.

The device control unit 111 integrally controls a plurality of devices 13 identified by a plurality of pieces of device identification information associated with the same user identification information. For example, the device control unit 111 can perform integrated control of a plurality of devices 13 based on pieces of device-specific information (see FIG. 5) of the plurality of devices 13.

There are various methods of integrated control, but an example will be described here. Here, a control example in which N battery systems (batteries to be controlled) are installed in the premises and power is received from the photovoltaics (PV) power generation facility and the power grid will be described.

First, the device control unit 111 sets the SOC use range of each battery (1 . . . N) to be controlled, that is, the SOC maximum value $SOC_{MAX(1, \ldots, N)}$ and the SOC minimum value $SOC_{MIN(1, \ldots, N)}$ are read from a BMS and device-specific information.

Then, the device control unit 111 estimates and calculates the current value of a ratio of charge/discharge energy per 1% SOC, a discharged energy rate $ER_{D(1, \ldots, N)}$, and a charged energy rate $ER_{C(1, \ldots, N)}$ from change histories of the accumulated data of each battery system, $SOC_{(1, \ldots, N)}$, cumulative discharged energy $AE_{D(1, \ldots, N)}$, and cumulative charged energy $AE_{C(1, \ldots, N)}$.

Then, the device control unit 111 calculates the available charge/discharge energy capacity based on the SOC current value $SOC_{(1, \ldots, N)}$ read from the BMS of each battery to be controlled. The available discharge energy capacity $AEC_{D(1, \ldots, N)}$, and the available charge energy capacity $AEC_{C(1, \ldots, N)}$ are calculated by the following expressions (1) and (2).

$$AEC_{D(1, \ldots, N)} = (SOC_{(1, \ldots, N)} - SOC_{MIN(1, \ldots, N)}) * ER_{D(1, \ldots, N)} \quad \text{Expression (1)}$$

$$AEC_{C(1, \ldots, N)} = (SOC_{MAX(1, \ldots, N)} - SOC_{(1, \ldots, N)}) * ER_{C(1, \ldots, N)} \quad \text{Expression (2)}$$

Then, the device control unit 111 adds up the available discharge energy capacities $AEC_{D(1, \ldots, N)}$ of each battery system to calculate the available discharge energy capacity $TAEC_D$ for all the plurality of battery systems. Further, the device control unit 111 adds up the available charge energy capacities $AEC_{C(1, \ldots, N)}$ of each battery system to calculate the available charge energy capacity $TAEC_C$ for all the plurality of battery systems.

Then, the device control unit 111 predicts the PV power generation amount from the change in the accumulated PV power generation amount, the meteorological information, and a meteorological information predicted value. In addition, the device control unit 111 predicts the power consumption on the day from the accumulated power use information from a smart meter, the PV power generation amount, the battery charge/discharge amount, month, day, day of a week, holiday information, meteorological information, and the like.

Then, the device control unit 111 determines a battery operation in consideration of economic rationality and the like, and issues a battery charge/discharge control command, based on the available discharge energy capacity $TAEC_D$ in all the plurality of battery systems, the available charge energy capacity $TAEC_C$ in all the plurality of battery systems, prediction of the PV power generation amount, and prediction of the power consumption. For example, the device control unit 111 may calculate an evaluation value (profit, loss, and the like) when the battery system is charged or discharge from the battery system is performed in each time section of the day, by a predetermined arithmetic operation expression based on the values of the above parameters and the power unit price (for each time section) when power is received from the power grid. In addition, the device control unit 111 may determine a charge/discharge schedule of the battery system so that the evaluation value becomes a predetermined condition (for example, the maximum, predetermined value or more, the minimum, and predetermined value or less).

Figure 8:
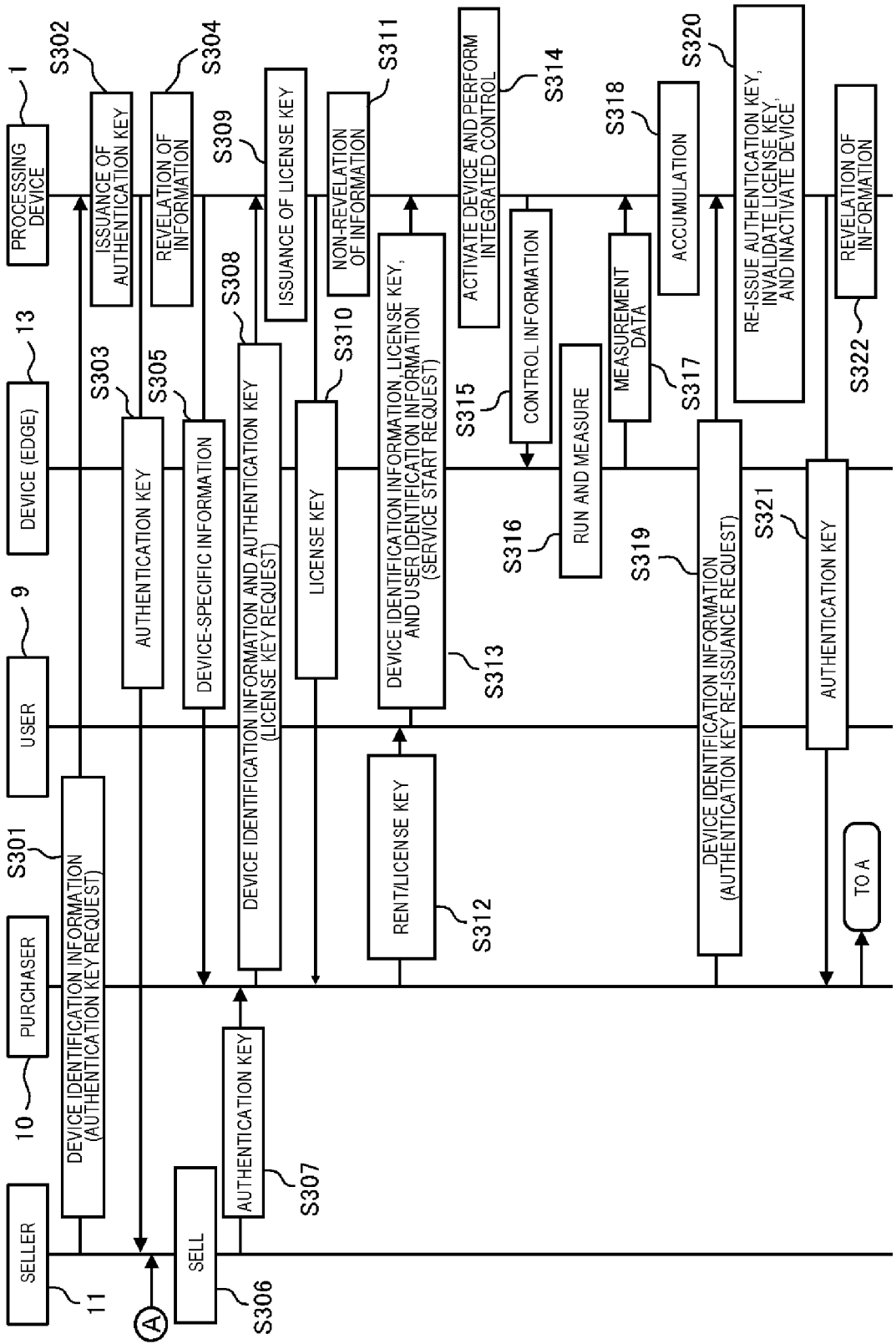
FIG. 8 is a sequence diagram showing an example of the processing flow of the processing device in the present embodiment.

Here, an example of a processing flow of the processing device 1 in the present embodiment will be described by using the sequence diagram in FIG. 8. As shown in FIG. 8, for example, a service start request in S313 may include user identification information. A user identification information registration unit 107 may acquire a license key and the user identification information included in a service start request. In the case of the example in FIG. 8, the flow of other processes is similar to the example in FIG. 3 described in the first embodiment.

Other components of the processing device 1 in the present embodiment are similar to those of the first embodiment.

"Advantageous Effect"

According to the processing device 1 in the present embodiment, the advantageous effects similar to those of the first embodiment are realized. Further, according to the processing device 1 in the present embodiment, it is possible to register a plurality of devices 13 in association with a user 9 who uses the devices 13 and to perform integrated control of the plurality of devices 13.

Further, according to the processing device 1 of the present embodiment, not only the user 9 who purchases and uses a new device 13 but also the user 9 who purchases and uses a used device 13 can register the device 13 to be used in association with the user 9 and set the device 13 to be used, as a target of the integrated control. As described above, even when a used product is purchased, the profit similar to that when a new product is purchased can be obtained. Thus, it is expected that the number of people who purchase the used product increases and the used product market is activated.

Further, according to the processing device 1 in the present embodiment, not only the user 9 who purchases and uses the device 13 but also the user 9 who borrows and uses the device 13 can register the device 13 to be used in association with the user 9. As described above, even when the device is rented and used, the profit similar to that when a new product is purchased and used can be obtained. Thus, it is expected that the number of people who rent the device 13 increases. As a result, it is expected that the number of people who purchase and rent the device 13 increases, and the sales market of the device 13 is activated.

Further, according to the processing device 1 in the present embodiment, the user 9 can collectively register the purchased device 13 and the borrowed device 13 in association with the user 9. Because of such convenience, it is expected that the number of people who purchase a new or used device 13 and the number of people who rent the device 13 increases. As a result, it is expected that the sales market of the device 13 is activated.

Further, the user 9 can collectively register a plurality of types of devices 13 having the use effect enhanced by the integrated control, in association with the user 9. Because of such convenience, it is expected that the number of people who purchase a new or used device 13 and the number of people who rent the device 13 increases. As a result, it is expected that the sales market of the device 13 is activated.

As described above, the user 9 can register the device 13 used by the user 9 in association with the user 9 with a high degree of freedom, and can set the registered device 13 as the target of the integrated control. As a result, the user 9 can freely control the expansion and reduction of the system including a plurality of devices 13 that are integrally controlled.

Third Embodiment

"Configuration"

A processing device 1 in the present embodiment performs processing for passing on a performance guarantee of the device 13 to a person who has purchased a used product.

In order to activate second-hand transactions of devices 13 in a battery system and the like, it is important to have a mechanism in which the performance guarantee by the manufacturer is passed on to the person who purchased the used product. The manufacturer provides a performance guarantee as a service attached to a product. The performance guarantee is used for recovering the performance by maintenance such as battery replacement when the battery fails or the performance falls below the standard. When it is not possible to pass on the performance guarantee in sales and purchase of used products, a service originally included in the product becomes lost, and this is disadvantageous to both the seller and the purchaser of the used product. On the other hand, in the case of a battery system or the like, deterioration progresses due to exposure to a high temperature during storage. Therefore, when the manufacturer wants to provide a guarantee to a used product purchaser, it is necessary to grasp the state of the device from the time when the device is sold as a used product until the use of the device is started in a new use location, and the performance before and after the sale. The processing device 1 in the present embodiment can solve the disadvantages of the seller, the purchaser, and the manufacturer at the time of such a used product transaction, and can activate the used product market. The processing device 1 will be described below in detail.

An authentication key issuing unit 102 issues an authentication key in response to an authentication key request including device identification information and predetermined information regarding performance guarantee (S102 in FIG. 3, S302 in FIG. 8, and the like). The predetermined information regarding the performance guarantee is the latest performance information of the device 13, the guarantee contents, and the like. The predetermined information regarding the performance guarantee is stored in a storage unit 112 as device-specific information and is set as a target of revelation.

When a collection unit 109 collects the measurement data in S117 in FIGS. 3 and S317 in FIG. 8, the collection unit 109 determines whether a use method does not satisfy a predetermined penalty condition (for example, use in a state where the temperature is out of an allowable range, continuous running for t hours or longer, and the like). When the predetermined penalty condition is satisfied, the collection unit 109 updates the content of the performance guarantee of the device 13 in accordance with the content. For example, it is assumed that the device 13 is a battery system having a capacity of 100 kWh, a guaranteed period of 10 years, a guaranteed charging mileage of 100 MWh, and a performance guaranteed capacity of 80 kWh are defined as performance guarantees at the time of sale. The collection unit 109 shortens the guaranteed period, reduces the guaranteed charging mileage, and reduces the performance guaranteed capacity, in accordance with the content of the penalty. For example, regarding the use in the state where the temperature is out of the allowable range, the magnitude of the deviation from the allowable range and the value according to the duration of the state may be reduced from the performance guaranteed capacity. An algorithm for determining the changed content of the performance guarantee from the content of the penalty may be other content. Further, the collection unit 109 may store the content of the corresponding penalty in the storage unit 112 as device-specific information. The information may also be set as the target of revelation.

Other components of the processing device 1 in the present embodiment are similar to those of the first and second embodiments.

"Advantageous Effect"

According to the processing device 1 in the present embodiment, the advantageous effects similar to those of the first and second embodiments are realized. Further, according to the processing device 1 in the present embodiment, it is possible to pass on the performance guarantee attached to a product at the time of sales and purchase of used products. The disadvantages of the seller and the used product purchaser due to the loss of the performance guarantee are reduced. Further, according to the processing device 1 in the present embodiment, it is possible for a purchase examiner to know the residual guarantee of the used product, so that the transaction becomes easy. Further, according to the processing device 1 in the present embodiment, it is possible to accumulate the use history of the device 13 and review the content of the performance guarantee in accordance with a use method. Thus, it is possible to suppress the disadvantage that the manufacturer unreasonably guarantees the performance.

Application Example

Here, FIG. 9 shows an application example of the processing device 1. A battery system, a power meter, a PV inverter, and a PV panel, which are examples of the device 13, are shown in user premises. The devices are connected to each other through a distribution network on the user premises. A distribution board/outlet 3 and a power load 7 are further connected to the distribution network. The distribution network on the user premises is connected to a wide area power grid 12.

The processing device 1 communicates with each device 13 to acquire various types of information and transmit control information. Further, the processing device 1 communicates with the user 9, the purchaser 10, and the seller 11 through the terminal devices, and transmits/receives the above-described information. The processing device 1 accumulates various types of information in a database 8.

Modification Example

The processing device 1 may manage the safe use period of each device 13. Then, when the safe use period has expired, the validity control unit 110 may invalidate the license key associated with the device 13. Due to the invalidation of the license key, the service start unit 106 ends the predetermined service for the device 13 identified by the device identification information associated with the invalidated license key (inactivates the device 13). In response to such an end, the device control unit 111 stops the control of the device 13.

When the license key is invalidated due to the expiration of the safe use period, the validity control unit 110 may store information indicating the expiration of the safe use period in the storage unit 112 in association with the device identification information of the device 13. The license key issuing unit 104 does not issue a new license key corresponding to the device identification information associated with the information indicating the expiration of the safe use period. Further, the authentication key issuing unit 102 does not issue a new authentication key corresponding to the device identification information associated with the information indicating the expiration of the safe use period. By performing the control as described above, it is possible to suppress the inconvenience that the device 13 of which the safe use period has expired is used or sold in the secondhand market.

Further, the revelation control unit 108 may reveal, as the device-specific information of each device 13, specification data of the device 13, an instruction manual, a photograph of the device 13 (external photograph, internal photograph), a photograph of another device 13 having the same model (for comparison), a performance display sticker attached to the device 13, and the like. In this manner, it is possible to provide more useful information for a person who examines purchase of the device 13.

Further, the revelation control unit 108 may reveal, as the device-specific information of each device 13, the rated performance of the device 13 and the comparison (including the measurement date) of the past and the latest performance (battery capacity of the battery system and the like). In this manner, it is possible to provide more useful information for a person who examines purchase of the device 13.

Further, the revelation control unit 108 may estimate the predicted lifespan of the device 13 when the device 13 is used in the designated use environment and use method, and provide the estimated lifespan as the device-specific information of each device 13. The estimation of the predicted lifespan is a design matter and any technique in the related art can be adopted. In this manner, it is possible to provide more useful information for a person who examines purchase of the device 13.

Further, although the processing device 1 reveals the device-specific information in response to the issuance of the authentication key, an information revelation range may be set by the issued authentication key. For example, the seller 11 who has received the authentication key sets the information revelation range. For example, in a special situation such as selling the device 13 while using the device 13, the seller 11 may desire not to widely reveal the device-specific information of the device 13 but to reveal some people who satisfy a predetermined condition. According to the modification example, it is possible to appropriately reveal information even under such a situation.

In this specification, "acquisition" means that "the own device goes to fetch data stored in another device or a storage medium" based on a user input or the instruction of the program (active acquisition)". For example, the acquisition includes at least one of requesting or inquiring about other devices to receive a response, accessing and reading other devices or storage media, and the like, and "inputting data output from another device to the own device (passive acquisition)" based on a user input or an instruction of the program, for example, receiving data distributed (or transmitted, push notification, and the like), selecting and acquiring data or information from the received data or information, and "generating new data by editing data (text conversion, data sorting, partial data extraction, file format change, and the like) and acquiring the new data".

Although the present invention has been described above with reference to the embodiments (and examples), the present invention is not limited to the above embodiments (and examples). Various changes that can be understood by those skilled in the art can be made within the scope of the present invention in terms of the configuration and details of the present invention.

Some or all of the above embodiments may also be described, but are not limited to the following description.

1. A processing device including:

a storage unit that stores device-specific information in association with device identification information for identifying each of a plurality of devices;

an authentication key request reception unit that receives an authentication key request including the device identification information, an authentication key issuing unit that issues an authentication key in response to the authentication key request, transmits the issued authentication key as a response, and stores the issued authentication key in the storage unit in association with the device identification information included in the authentication key request, a license key request reception unit that receives a license key request including the device identification information and the authentication key, a license key issuing unit that, when the storage unit stores a combination of the device identification information and the authentication key included in the license key request, issues a license key for receiving a predetermined service related to the device, transmits the issued license key as a response, and stores the issued license key in the storage unit in association with the device identification information included in the license key request, and a user identification information registration unit that stores user identification information of a user who has presented the license key, in the storage unit in association with the device identification information associated with the license key, and a device control unit that integrally controls the plurality of the devices identified by a plurality of pieces of the device identification information associated with the same user identification information.

2. The processing device described in 1, in which the device control unit integrally controls a plurality of the devices based on pieces of the device-specific information of a plurality of the devices.

3. The processing device described in 1 or 2, further including:

a collection unit that collects at least one of performance information, safety information, a use history, latest performance, and lifespan prediction of the device as the device-specific information, and stores the collected device-specific information in the storage unit.

4. The processing device described in 3, in which the collection unit collects various types of measurement data of the device, generates at least one of the performance information, the safety information, the latest performance, and the lifespan prediction based on the measurement data, and stores the generation resultant in the storage unit.

5. The processing device described in any one of 1 to 4, further including:

a service start request reception unit that receives a service start request including the device identification information and the license key, and a service start unit that starts a predetermined service for the device identified by the device identification information included in the service start request, when the storage unit stores a combination of the device identification information and the license key included in the service start request.

6. The processing device described in any one of 1 to 5, in which the device includes at least one of a battery system, a power generation device, and a power meter.

7. A processing method including: by a computer, storing device-specific information in association with device identification information for identifying each of a plurality of devices, receiving an authentication key request including the device identification information, issuing an authentication key in response to the authentication key request, transmitting the issued authentication key as a response, and storing the issued authentication key in a storage unit in association with the device identification information included in the authentication key request, receiving a license key request including the device identification information and the authentication key, when the storage unit stores a combination of the device identification information and the authentication key included in the license key request, issuing a license key for receiving a predetermined service related to the device, transmitting the issued license key as a response, and storing the issued license key in the storage unit in association with the device identification information included in the license key request, and storing user identification information of a user who has presented the license key, in the storage unit in association with the device identification information associated with the license key, and integrally controlling a plurality of the devices identified by a plurality of pieces of the device identification information associated with the same user identification information.

8. A program causing a computer to function as:

a storage unit that stores device-specific information in association with device identification information for identifying each of a plurality of devices, an authentication key request reception unit that receives an authentication key request including the device identification information, an authentication key issuing unit that issues an authentication key in response to the authentication key request, transmits the issued authentication key as a response, and stores the issued authentication key in the storage unit in association with the device identification information included in the authentication key request, a license key request reception unit that receives a license key request including the device identification information and the authentication key, a license key issuing unit that, when the storage unit stores a combination of the device identification information and the authentication key included in the license key request, issues a license key for receiving a predetermined service related to the device, transmits the issued license key as a response, and stores the issued license key in the storage unit in association with the device identification information included in the license key request, a user identification information registration unit that stores user identification information of a user who has presented the license key, in the storage unit in association with the device identification information associated with the license key, and a device control unit that integrally controls the plurality of the devices identified by a plurality of pieces of the device identification information associated with the same user identification information.

The invention claimed is:

1. A processing device comprising:

at least one memory configured to store instructions; and at least one processor configured to execute the instructions to:

store, in the at least one memory, device-specific information in association with device identification information for identifying each of a plurality of devices including at least one of a battery system, a power generation device, and a power meter, receive an authentication key request including the device identification information, issue an authentication key in response to the authentication key request, transmit the issued authentication key as a response, reveal the device specific information of a device associated with the device identification information and having the issued authentication key, store the issued authentication key in the at least one memory in association with the device identification information included in the authentication key request, receive a license key request including the device identification information and the authentication key, based on storage of a combination of the device identification information and the authentication key included in the license key request, issue a license key for receiving a predetermined service related to a respective device from the plurality of devices, transmit the issued license key as a response, and store the issued license key in the at least one memory in association with the device identification information included in the license key request, store user identification information of a user who has presented the license key, in the at least one memory in association with the device identification information associated with the license key, and control the plurality of the devices identified by a plurality of pieces of the device identification information associated with the same user identification information, wherein the device-specific information of a device is not revealed based on a determination that the license key is issued and the authentication key is not issued.

2. The processing device according to claim 1, wherein the at least one processor is further configured to execute the instructions to:

control a plurality of the devices based on pieces of the device-specific information of the plurality of the devices.

3. The processing device according to claim 1, wherein the at least one processor is further configured to execute the instructions to:

collect at least one of performance information, safety information, a use history, and lifespan prediction of the respective device from the plurality of devices as the device-specific information, and stores the collected device-specific information in the at least one memory.

4. The processing device according to claim 3, wherein the at least one processor is further configured to execute the instructions to:

collect various types of measurement data of the respective device from the plurality of devices, generate at least one of the performance information, the safety information, and the lifespan prediction based on the measurement data, and store the at least one in the at least one memory.

5. The processing device according to claim 1, wherein the at least one processor is further configured to execute the instructions to:

receive a service start request including the device identification information and the license key, and based on storage of a combination of the device identification information and the license key included in the service start request, start a predetermined service for the respective device from the plurality of devices identified by the device identification information included in the service start request.

6. A processing method performed by at least one processor, the method comprising:

storing device-specific information in association with device identification information for identifying each of a plurality of devices including at least one of a battery system, a power generation device, and a power meter;

receiving an authentication key request including the device identification information;

issuing an authentication key in response to the authentication key request, transmitting the issued authentication key as a response, and storing the issued authentication key in a storage unit in association with the device identification information included in the authentication key request;

revealing the device specific information of a device associated with the device identification information and having the issued authentication key;

receiving a license key request including the device identification information and the authentication key;

based on the storage unit storing a combination of the device identification information and the authentication key included in the license key request, issuing a license key for receiving a predetermined service related to a respective device from the plurality of devices, transmitting the issued license key as a response, and storing the issued license key in the storage unit in association with the device identification information included in the license key request;

storing user identification information of a user who has presented the license key, in the storage unit in association with the device identification information associated with the license key; and integrally controlling the plurality of the devices identified by a plurality of pieces of the device identification information associated with the same user identification information, wherein the device-specific information of a device is not revealed based on a determination that the license key is issued and the authentication key is not issued.

7. A non-transitory computer readable medium having instructions stored therein, which when executed by a processor cause the processor to:

store, in a storage unit, device-specific information in association with device identification information for identifying each of a plurality of devices including at least one of a battery system, a power generation device, and a power meter;

receive an authentication key request including the device identification information;

issue an authentication key in response to the authentication key request, transmit the issued authentication key as a response, and store the issued authentication key in the storage unit in association with the device identification information included in the authentication key request;

reveal the device specific information of a device associated with the device identification information and having the issued authentication key;

receive a license key request including the device identification information and the authentication key;

based on storage of a combination of the device identification information and the authentication key included in the license key request in a storage unit, issue a license key for receiving a predetermined service related to a respective device from the plurality of devices, transmit the issued license key as a response, and store the issued license key in the storage unit in association with the device identification information included in the license key request;

store user identification information of a user who has presented the license key, in the storage unit in association with the device identification information associated with the license key; and integrally control the plurality of the devices identified by a plurality of pieces of the device identification information associated with the same user identification information, wherein the device-specific information of a device is not revealed based on a determination that the license key is issued and the authentication key is not issued.

8. The processing device according to claim 1, wherein the plurality of devices include at least one of a new device, a used device, and a rental device.

9. The processing device according to claim 1, wherein the at least one processor is further configured to execute the instructions to:

receive the authentication key request sent by a seller of the device, receive the license key request sent by a purchaser of the device, and store user identification information of a user who uses the device, in the at least one memory in association with the device identification information.

* * * * *